Patented Apr. 27, 1943

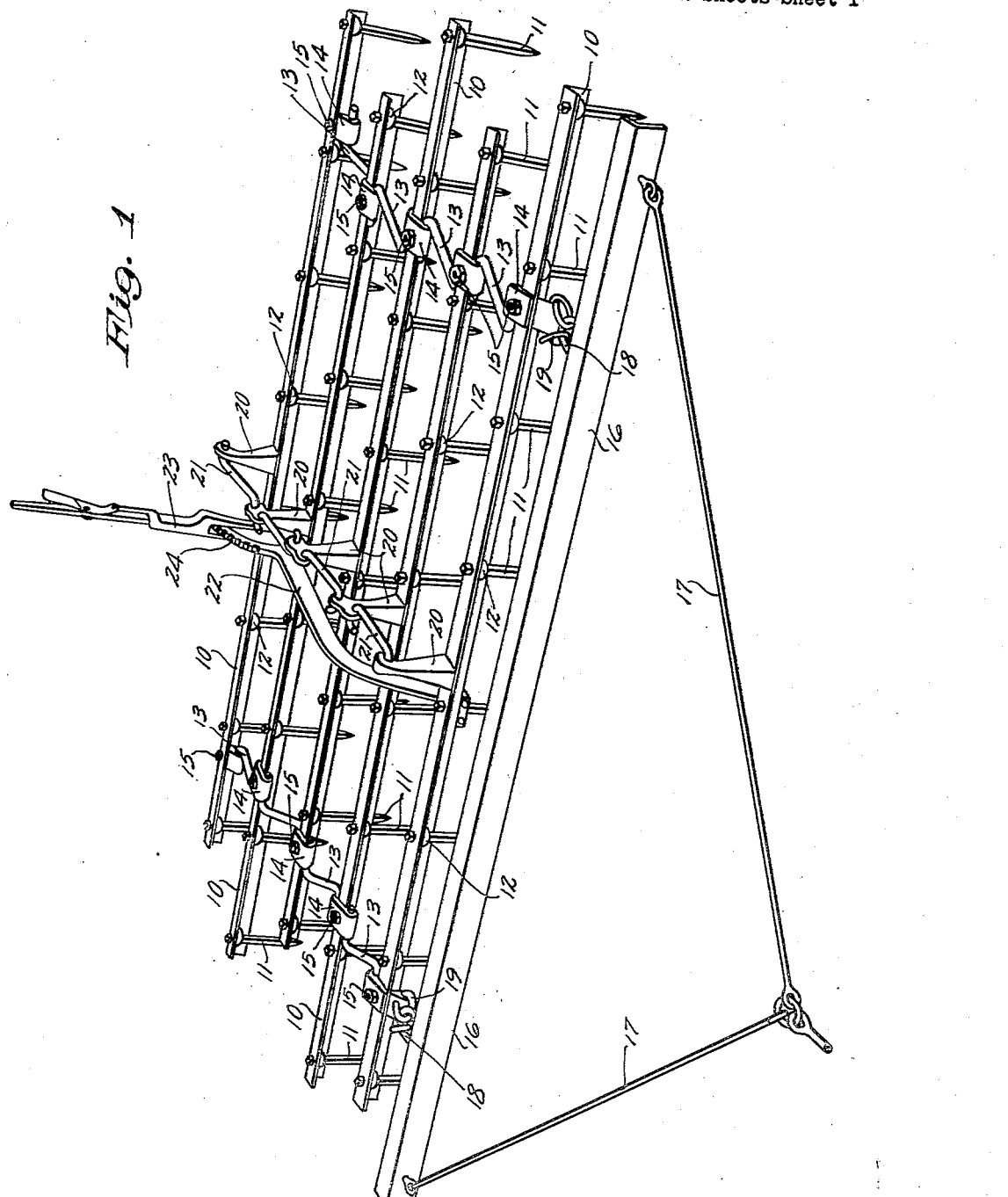

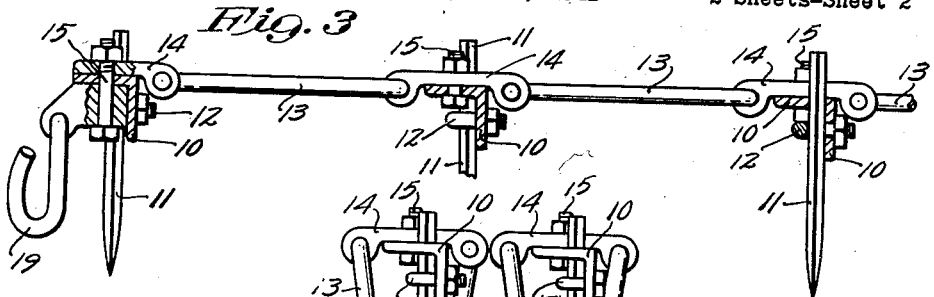
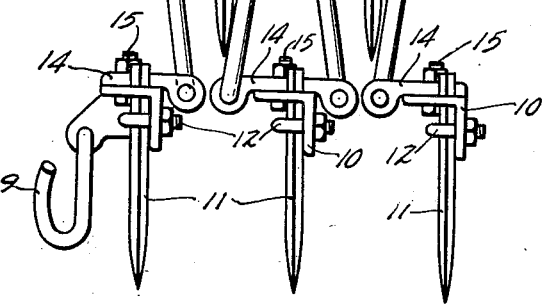
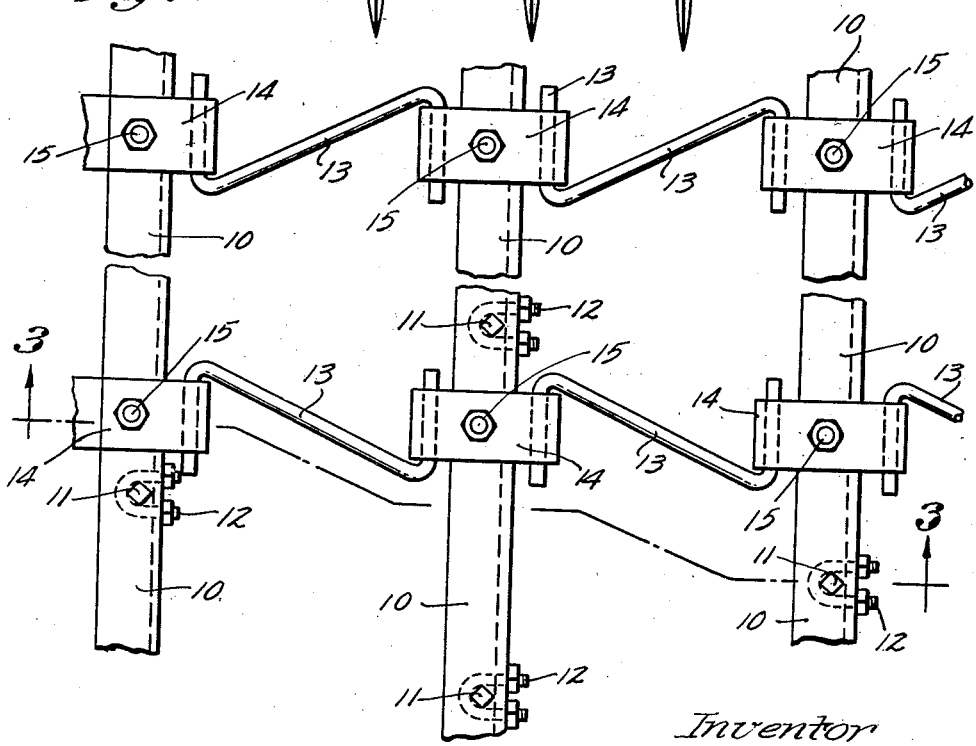

2,317,537

UNITED STATES PATENT OFFICE 2,317,537

HARROW

John R. Kovar, Anoka, Minn.

Application October 29, 1941, Serial No. 416,961

5 Claims. (Cl. 55—76)

Primarily my invention has for its object to provide an improved harrow, but the novel features thereof are capable of incorporation in various analogous devices such, for example, as road graders. In harrows and road scarifiers, the drag bars are provided with depending teeth, but in scrapers the drag bars are customarily provided with scraper blades with more or less straight edges. In all of the devices, such as noted, the drag bars are customarily connected by links that permit independent upward and downward or rising and falling movements of the several bars.

My invention is directed particularly to an improved form and arrangement of links that connect the several drag bars and involves the use of Z-shaped links, the pivot-forming ends of which project in opposite directions but in the direction of the draft strains extend one behind the other. The pivot-forming ends of these Z-shaped links are connected to coupling lugs or blocks that are located on the drag bars directly one behind the other. When the links are thus applied, the couplings between the spaced drag bars will be directly in the line of draft. Furthermore, I have found that when certain of the laterally spaced Z-shaped coupling links are reversed, one in respect to the other, endwise thrust on the drag bars will not unseat or disconnect any of the links from their co-operating lugs; and that this is true even when the projecting ends of the Z-shaped links are perfectly straight and otherwise free for endwise removal. This arrangement, therefore, not only provides elements that may be cheaply made but that may be very quickly and easily assembled and requires only that the lugs or coupling blocks be secured to the co-operating drag bars after the Z-shaped links have been inserted therein and before at least all of the lugs or blocks have been attached to the drag bars.

The embodiment of the invention in a harrow is illustrated in the accompanying drawings wherein like characters indicate like parts throughout the several views.

Referring to the drawings:

Fig. 1 is a view in perspective showing a commercial form of harrow embodying the invention;

Fig. 2 is a fragmentary plan view of the harrow, various parts being broken away;

Fig. 3 is a section taken approximately on the line 3—3 of Fig. 2; and

Fig. 4 is a view corresponding in line of its vision to Fig. 3 but showing the harrow folded up into small space by moving the bars thereof into close contact.

In the harrow here illustrated, the drag bars 10 are formed of angle iron and its vertically adjustable depending teeth 11 are rigidly secured thereto by nut-equipped eye-bolts 12. The Z-shaped links are indicated by the numeral 13. The parallel trunnion forming ends of these links 13 are simply inserted through closely fitting holes in the ends of metallic lugs 14 that are rigidly but detachably secured on the respective bars 10 by nut-equipped bolts 15.

The above described links and lugs in Fig. 1 are shown as applied only in one row at the right and in another row at the left of the central portion of the harrow; and it is here important to note that the Z-shaped links at the right are reversed laterally in respect to the Z-shaped links at the left. It will now be apparent that the Z-shaped links can be disconnected from their respective lugs only by endwise movement of the one drag bar in respect to the other and that such endwise movement of any drag bar is positively prevented by the reverse arrangement of the said links at the right and at the left. Hence, it follows, certain of the lugs would have to be removed before the links can be detached, and conversely, that the lugs would be applied to the bars after they had been connected to the links. The lugs or coupling blocks on the intermediate drag bar are double-ended, but those on the front and rear bars need be only single-ended.

The front drag bar is preferably connected to an equalizing bar 16 having suitable connections, such as drag rods 17, for coupling of the device to a tractor or the like. As shown, the connection between the front drag bar and the equalizing bar 16 is made by chain links 18 and lugs 19, which latter, in the particular structure illustrated, are shown as connected to said front bar by means of the same bolts 15 that connect the front lugs 14 to said front drag bar.

With this arrangement it is evident that the line of strain through the links connecting the said drag bars is on a straight line and directly in the line of draft so that there is no endwise offsetting of the drag bars or of the lugs 14.

Suitable means for rocking the drag bars will be provided and, as shown, this may be accomplished as follows: The drag bars, at their central portions, are provided with rigidly secured upstanding arms 20 connected by links 21 so that the several drag bars will be simultaneously rocked. With this connection, when one of the bars is rocked, the other bars will be simultaneously rocked and adjusted. As a means for producing the rocking adjustment of the bars, I have shown a thrust link 22 and a lever 23. Thrust bar 22, at its front end, will be pivotally connected to the front drag bar and at its lower end, it is shown as provided with a notched lock segment 24 with which the lever 23 co-operates. Lever 23 will be assumed to be rigidly secured to the intermediate portion of the rear drag bar 10. However, the thrust link and lever structure is not herein claimed and other means may be provided for imparting the rocking adjustments to the drag bars.

Fig. 4 shows the manner in which the harrow described may be folded into small space for storage, shipment, or for movement through narrow gates or doors.

It will be noted that the links 13 have parallel trunnion ends that project in opposite directions. These trunnions-like ends primarily are freely insertable through the holes in the coupling lugs. When certain of these links are reversed, one in respect to the other, and when the lugs are secured on the drag bars, the latter are held against endwise movements, the one in respect to the other, and the links are held interlocked but pivotally connected to the respective lugs.

What I claim is:

1. In a device of the kind described, a plurality of drag bars, and Z-shaped links connecting said bars, said links being arranged in longitudinally and transversely spaced rows, certain of the links in different rows being reversed in respect to the others, whereby said bars are held against endwise movements and the trunnions of said links are held in their respective seats.

2. In a device of the kind described, a plurality of drag bars, and Z-shaped links connecting said bars, said links being arranged in longitudinally and transversely spaced rows, certain of the links in different rows being reversed in respect to the others, whereby said bars are held against endwise movements and the trunnions of said links are held in their respective seats, the trunnions of said links being parallel and affording pivots permitting independent vertical movements of the bars.

3. In a device of the kind described, a plurality of drag bars, coupling lugs laterally spaced on said bars in rows that are in the line of draft, and Z-shaped links having parallel trunnion-like ends pivotally and freely inserted through seats in said lugs, the links that are in one row being reversed in respect to the other, whereby the pivotal engagement between the said lugs and trunnion-like ends of said links is maintained and said drag bars are held against endwise movements.

4. The structure defined in claim 3 in which said lugs are rigidly but detachably secured to said bars.

5. In a device of the kind described, a plurality of drag bars provided with coupling lugs spaced thereon longitudinally thereof, and approximately Z-shaped links having parallel trunnion-like ends projecting therefrom in opposite directions and pivotally connected to lugs of adjacent drag bars, certain of said links being reversed, one in respect to another, thereby holding said drag bars against endwise movements, the one in respect to the other.

JOHN R. KOVAR.